INVENTOR.
JOHN W. RALLS
BY
Lippincott & Ralls
ATTORNEYS

INVENTOR.
JOHN W. RALLS

BY

Lippincott & Ralls
ATTORNEYS 3,149,200

COLOR TELEVISION PICTURE TUBE AND CIRCUIT FOR PROVIDING SUPERPOSED COLOR AND BLACK AND WHITE IMAGES

John W. Ralls, 425 Nevada Ave., Palo Alto, Calif.
Filed Dec. 23, 1959, Ser. No. 861,686
3 Claims. (Cl. 178—5.4)

This invention relates to color television display apparatus and in particular to an improved color television picture tube and circuit. The principal objects of the invention are as follows:

To reduce manufacturing and maintenance costs by increasing tolerance to minor misalinements and maladjustments while maintaining acceptable picture quality;

To increase the brightness of the picture;

To improve the resolution of fine detail;

To provide a more pleasing color presentation and particularly a more faithful reproduction of unsaturated colors;

To provide a full-color receiver capable of monochrome reception and reproduction with a quality equivalent to that of high-quality monochrome receivers.

In brief, this invention provides an improved circuit incorporating a picture tube having a screen composed of white light-emitting elements intermingled with colored light-emitting elements, with separate means for selectively exciting the colored and white light-emitting elements. As a specific example, the picture tube may be similar to the conventional three-gun shadow-mask tubes now in use, except that the phosphor screen of the tube comprises white light-emitting dots as well as the usual red, green, and blue light-emitting dots, and is provided with a fourth electron gun for exciting the white light-emitting dots of the phosphor screen.

Conventional circuitry may be employed to supply the usual Y, $R-Y$, $G-Y$, and $B-Y$ video signals, where Y represents the luminance component of a standard, composite video signal, and R, G, and B represent the red, green, and blue components. The Y component, at substantially full bandwidth, is supplied to the electron gun that excites the white light-emitting phosphor dots, and thereby a full-detail monochrome (black-and-white) picture is produced on the phosphor screen. The Y component is also supplied to a low-pass filter that transmits frequencies only up to about one-half megacycle. Thus, a luminance signal of restricted bandwidth is provided, and this restricted bandwidth signal is added to each of the $R-Y$, $G-Y$, and $B-Y$ signals. The R, G, and B signals thus developed are of restricted bandwidth, and hence lack the fine detail of the picture. These three signals (R, G, and B) are supplied to the other three guns of the picture tube for exciting the red, green, and blue light-emitting dots of the phosphor screen. In this way, a limited-detail, full-color picture of the same scene is displayed in superposed relation to the monochrome picture.

The foregoing and other aspects of the invention may be better understood by referring to the following, detailed description and the accompanying drawings.

Figure 1:
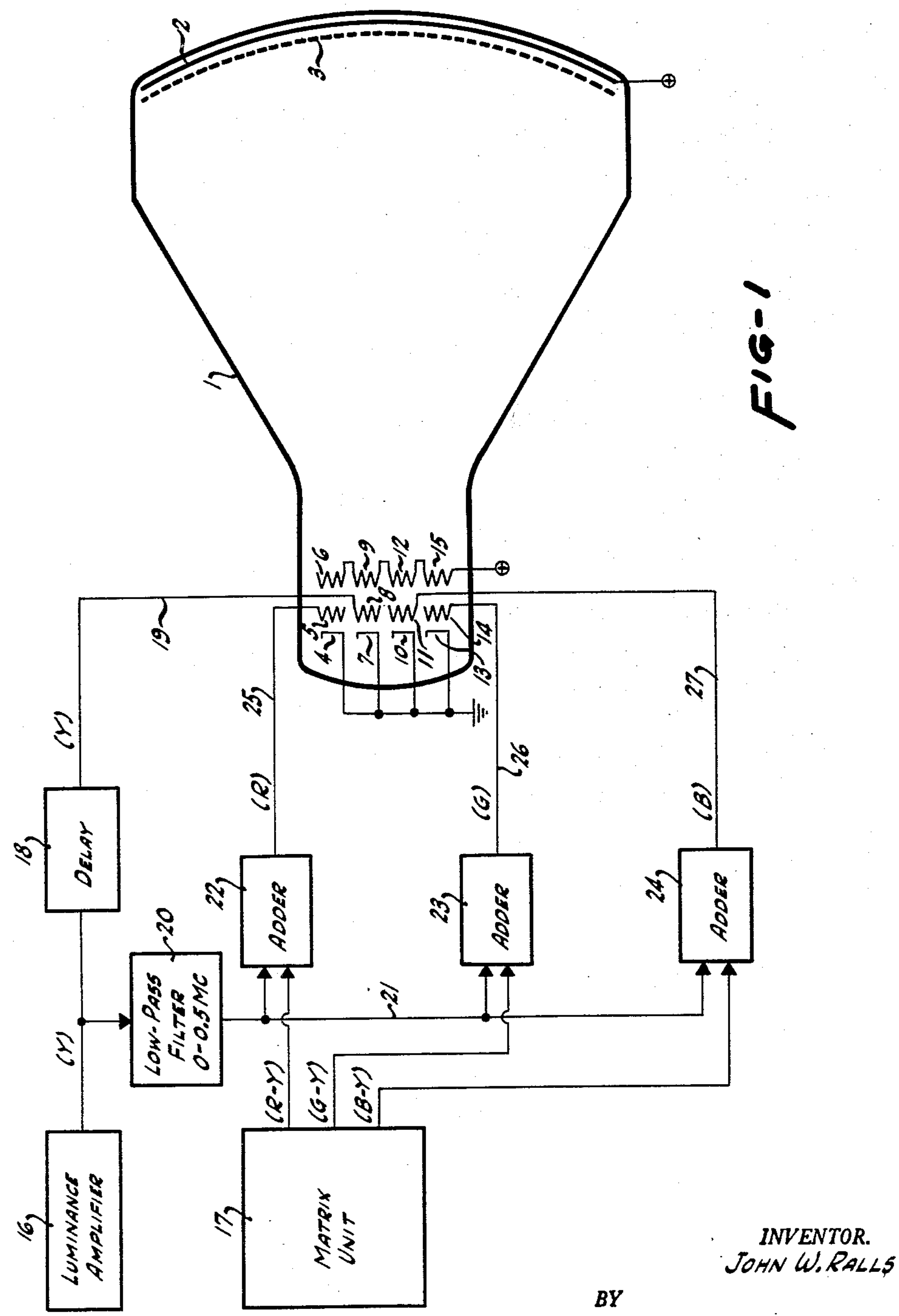
Figure 2:
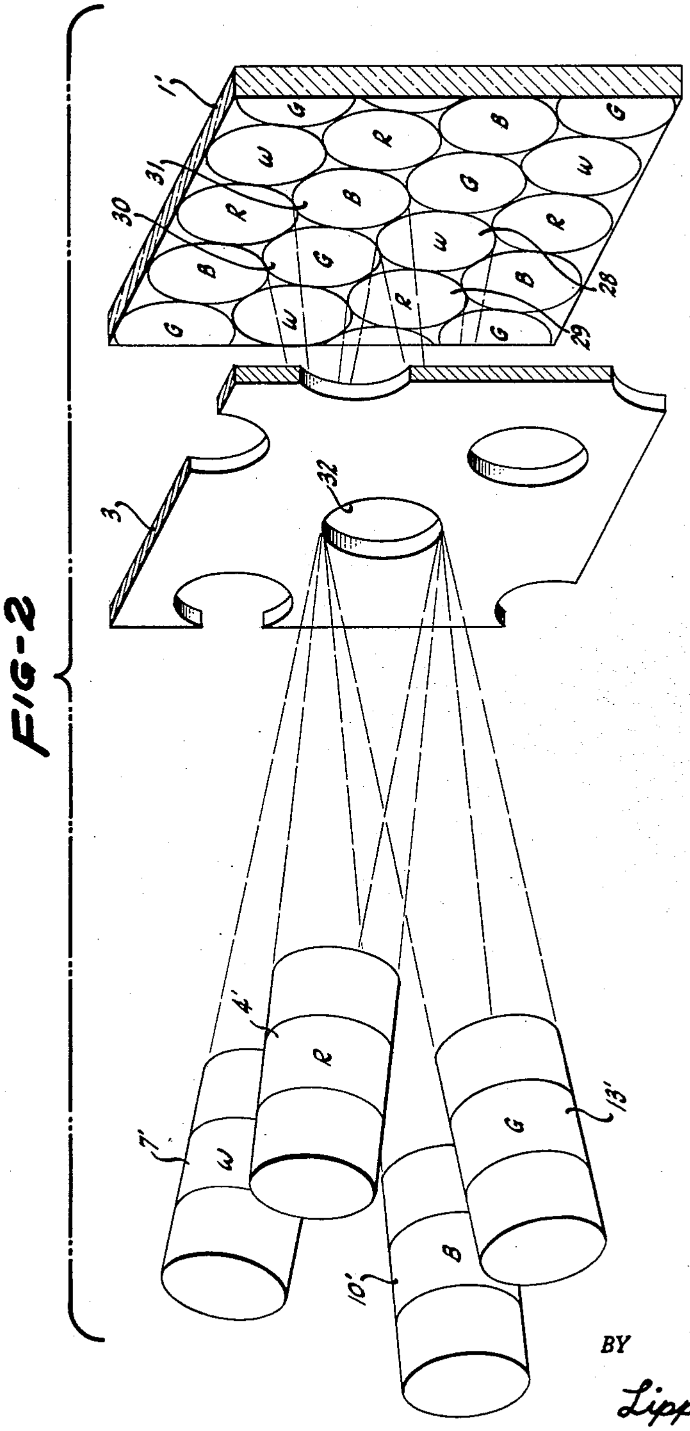

FIG. 1 of the drawings is a schematic circuit representation of a picture tube and circuit embodying this invention;

FIG. 2 is a fragmentary, schematic representation illustrating the principle of operation of the four-gun, shadow-mask tube.

Referring to FIG. 1, the picture tube has a conventional evacuated envelope 1 with a phosphor screen 2 on or adjacent to the inner face of the envelope at the large end of the tube. Behind the screen there is a mask 3 provided with a plurality of electron-permeable apertures so that each electron gun of the tube can bombard only selected areas of the phosphor screen 2. Except for the pattern of the apertures in the mask 3 (see FIG. 2) and the arrangement of the different-colored light-emitting dots in the screen 2, the picture tube as thus far described may be identical to the shadow-mask color television tubes currently in use in most color television receivers.

Screen 2 is composed of a plurality of groups of light-emitting elements disposed in a regular, repetitive, mosaic pattern, there being one such group in electron-optical alinement with each aperture of the mask 3. In conventional, three-gun, shadow-mask tubes there are three such dots in each group: a red light-emitting dot, a green light-emitting dot, and a blue light-emitting dot. In the four-gun tube, each of said groups is composed of four phosphor dots: a white light-emitting dot, a red light-emitting dot, a green light-emitting dot, and a blue light-emitting dot.

Within the neck of the envelope 1, there is a bundle of four electron guns. The construction is similar to that of present three-gun picture tubes except for the addition of a fourth gun to the bundle. One gun comprises a cathode 4, a control grid 5, and one or more accelerating electrodes 6; another gun comprises a cathode 7, a control grid 8, and one or more accelerating electrodes 9; a third gun comprises a cathode 10, a control grid 11, and one or more accelerating electrodes 12; and the fourth gun comprises a cathode 13, a control grid 14, and one or more accelerating electrodes 15. In the illustrated embodiment, all of the four cathodes are connected together and grounded, separate leads are provided for supplying signals to the four control grids, and the accelerating electrodes are connected to any appropriate source of accelerating voltage.

The picture tube is provided, of course, with conventional deflection yokes and other conventional parts (not shown), similar to those provided for three-gun picture tubes. As previously stated, the essential difference between the present picture tube and prior-art, three-gun, shadow-mask tubes is the addition of a fourth electron gun and the provision of a phosphor screen having four rather than three light-emitting dots in each group—the fourth dot being of a phosphor that emits white light, similar to the phosphors used in monochrome picture tubes. Each of the four electron guns is alined to bombard only one phosphor dot in each group, and the corresponding dots in all groups, sequentially. Thus, gun 4, 5, 6 produces a beam which is restricted by mask 3 to the red light-emitting dots of screen 2; gun 7, 8, 9 produces a beam which is restricted to the white light-emitting dots of the screen 2; gun 10, 11, 12 produces a beam which is restricted to the blue light-emitting dots; and gun 13, 14, 15 produces a beam which is restricted by mask 3 to the green light-emitting dots of screen 2.

In the circuitry for operating the four-gun picture tube, the luminance amplifier 16, the matrix unit 17, and all circuit components preceding these two units may be identical to those found in presently well-known television receivers. Conventional deflection or scanning circuits are also provided—being conventional, these parts are not shown. The luminance amplifier 16 provides at its output the conventional monochrome video signal (Y) of substantially full bandwidth (usually 3 megacycles or more), which constitutes the luminance component of the standard, composite video signal. This Y signal is supplied through a time-delay circuit 18 and connections 19 to the control grid 8 of the electron gun that excites the white light-emitting phosphor dots. (Delay circuit 18 is provided for the well-known and conventional purpose of equalizing delays in the luminance and chrominance channels of the receiver. It is not essential to the novel principles of this invention.) Thus, the white light-emitting dots of screen 2 produce a full-detail, monochrome (black-and-white) picture at the face of the picture tube.

The matrix unit 17 provides the usual $R-Y$, $G-Y$, and $B-Y$ signals derived from the demodulated chrominance component of the composite video signal. Customarily, the bandwidth of these signals is only about one-half megacycle, and therefore they do not in themselves carry the fine detail of the picture, such fine detail being carried entirely by the luminance component. In conventional three-gun television receivers, the full bandwidth, luminance (Y) signal is added to each of the $R-Y$, $G-Y$, and $B-Y$ signals, either within the picture tube itself or in separate adding circuits.

In practicing the present invention, the full bandwidth, luminance (Y) signal is preferably supplied to a low-pass filter 20, which transmits frequencies only up to about one-half megacycle. Thus, the filter 20 supplies to lead 21 a luminance signal of restricted bandwidth (zero to one-half megacycle, approximately) having about the same bandwidth as the $R-Y$, $G-Y$, and $B-Y$ signals, and therefore similarly lacking the fine-detail information of the picture to be displayed. The limited bandwidth luminance signal from lead 21 is added to each of the $R-Y$, $G-Y$, and $B-Y$ signals by the three conventional adders 22, 23, and 24. This produces, in the leads 25, 26, and 27, a signal (R) representing the red components of the picture, a signal (G) representing the green components of the picture, and a signal (B) representing the blue components of the picture. These R, G, and B signals are similar to the R, G, and B signals that are derived and supplied to three-gun picture tubes in well-known prior-art television receivers, except that, in the present circuit, the R, G, and B signals are limited to about one-half megacycle bandwidth and hence lack the fine-detail information of the picture.

Lead 25 supplies the red (R) signal to the control grid 5 of the electron gun that excites the red light-emitting phosphor dots; lead 26 supplies the green (G) signal to the control grid 14 of the electron gun that excites the green light-emitting phosphor dots; and lead 27 supplies the blue (B) signal to the control grid 11 of the electron gun that excites the blue light-emitting phosphor dots of screen 2. Thus, a full-color picture, but one lacking fine detail, is provided at screen 2 in superposed relation to the full-detail, monochrome picture produced by the white light-emitting dots.

In FIG. 2, 1' represents a greatly enlarged fragment of the face of envelope 1. The phosphor screen deposited on the inside front face of the envelope is composed of a plurality of similar groups of light-emitting elements disposed in a regular, repetitive, mosaic pattern. One such group consists of the four phosphor dots 28, 29, 30, and 31. Dot 28 is a phosphor that emits white light when bombarded by electrons, as indicated by the letter W; dot 29 is a phosphor that emits red light when bombarded by electrons, as indicated by the letter R; dot 30 is a phosphor that emits green light when bombarded by electrons, as indicated by the letter G, and dot 31 is a phosphor that emits blue light when bombarded by electrons, as indicated by the letter B. Electron-optically alined with this group of four phosphor dots is the electron-permeable aperture 32 (e.g., a hole) in the metal mask 3.

The four electron guns are represented at 7', 4', 10', and 13'. (The drawing is schematic and not to scale.) The electron beam generated by each gun is represented by a pair of parallel broken lines. It will be noted that gun 4' is alined so that its beam, on passing through aperture 33, bombards only the red light-emitting dot 29; that gun 7' is alined so that its beam bombards only the white light-emitting dot 28; that gun 10' is so alined that its beam bombards only the blue light-emitting dot 31; and that gun 13' is so alined that its beam only bombards the green light-emitting dot 30. Except for the addition of the fourth gun, 7', and the fourth, white light-emitting dot 28 in each group of light-emitting elements of the phosphor screen, operation is precisely analogous to that of the well-known, three-gun, shadow-mask television picture tubes in common current usage.

The four-gun tube may be compared with the prior three-gun tube as follows:

In the conventional, three-gun, picture tube, all three beams must be sharply focused throughout the scanning cycle and must be scanned over the scanning raster in exact synchronization—otherwise, irritating, colored ghosts and other undesirable effects will be produced, because the beam from each gun reproduces fine detail of the picture (to the extent that such detail is reproduced at all) and any misalinement or malfunctioning of the guns, focusing, and scanning apparatus will produce misregistration between the detail produced by one beam and the detail produced by another.

With the four-gun tube, fine detail is modulated upon the beam supplied by gun 7' only, and is reproduced only in monochrome by the white light-emitting phosphor dots. The beams supplied by the other three guns carry no fine detail of the picture, and therefore these three guns need not be as sharply focused (and may be deliberately defocused to a slight extent). Hence, a slight misregistration between the colored images is of less consequence than in conventional picture tubes. Major design attention can be given to providing sharp focus of the single beam produced by gun 7' which excites the white light-emitting phosphor dots, and less attention need be given to the focusing and alinement of the other three guns. As a result, fine detail can be reproduced more faithfully and at the same time minor misalinements and maladjustments are more tolerable—there is both an improvement in picture quality, and a reduction in manufacturing and maintenance costs because of less strict tolerance requirements.

A further improvement in the representation of fine detail is realized in scenes containing a considerable amount of blue. In a conventional, three-gun picture tube and circuit, all of the detail in blue areas must be supplied by the gun responsive to the B signal. This signal is obtained by adding the Y (luminance) signal to the $B-Y$ signal derived from demodulation of the chrominance subcarrier. The $B-Y$ signal, however, has a narrow bandwidth, and hence carries no fine detail. The Y signal carries the fine detail, but its amplitude in this case is relatively small because of the low luminance of blue. The result, with prior picture tubes, is very poor reproduction of fine detail in blue-colored areas of a picture. With the four-gun tube and circuit here described, the B signal carries no fine detail, but a monochrome representation of approximately equal luminance is superposed upon the blue picture, and the fine detail is readily distinguished.

It will be further noted that a substantial increase in brightness is achieved with the four-gun tube. Because each group now contains four phosphor dots instead of three, the area of each dot in proportion to the area of the group as a whole, and likewise the areas of the apertures in screen 2 relative to the masked areas, must be reduced by 25%. This in turn leads to a 25% reduction in the brightness of the full-color picture. On the other hand, the monochrome picture displayed in superposed relation to the full-color picture is of approximately equal luminance, and therefore the total or overall brightness is increased by about 50%.

With the simple circuitry illustrated in FIG. 1, none of the colors reproduced by the four-gun tube will ever be quite fully saturated, because there will always be at least a small amount of light emitted by the white light-emitting phosphors. As a practical matter, the color dilution may be unnoticeable, or even beneficial. Consider saturated blue, for example. To represent this color the beam of the B gun 10' should be full on, and, ideally, all of the other beams should be completely cut off. With the circuit shown, the W gun 7' will not be quite cut off. Blue has a luminance of 0.11, and this luminance signal Y will be supplied through lead 19 to the control grid of the white-exciting electron gun. In other words, the electric signal supplied to the white-exciting gun will be about 11% of that supplied to the blue-exciting gun. The gamma of the tube reduces this to about 1% in terms of light output, and consequently the emission of blue light is diluted with about 1% of white light, which amounts to a negligible desaturation of the blue color. In other cases, e.g., yellow, the desaturation may be greater.

On the other hand, unsaturated colors are more faithfully reproduced with the four-gun tube than with the prior, three-gun tube. This is because the gamma of the tube tends to produce oversaturated colors, and the addition of white light through operation of the fourth gun tends to correct the over-saturation due to gamma. Hence, unsaturated colors are more faithfully reproduced, and the overall color reproduction may be considered more pleasing, more natural, and less artificial in appearance.

Finally, the four-gun tube can be operated as a single-gun, monochrome picture tube simply by biasing the three guns 4', 10', and 13' to cutoff. Thus, high-quality monochrome reception and reproduction is assured, and the well-known difficulties of achieving good monochrome reproduction from full-color picture tubes are eliminated.

What is claimed is:

1. Color television display apparatus comprising a screen composed of a plurality of white light-emitting elements and a plurality of colored light-emitting elements mingled together, means for exciting said white light-emitting elements selectively to provide a full-detail monochrome rendition of a scene to be displayed, and means for exciting said colored light-emitting elements selectively to provide a limited detail, full-color rendition of the same scene superposed on the monochrome rendition.

2. Color television display apparatus comprising first display means for displaying a monochrome picture, second display means for displaying a multi-color picture superposed upon said monochrome picture, first circuit means for providing a substantially full bandwidth monochrome video electric signal completely representing the luminance components of the scene to be displayed, second circuit means for providing narrow bandwidth electric signals completely representing the several color components of the same scene, means operatively connecting said first circuit means to said first display means, and means operatively connecting said second circuit means to said second display means, whereby a full-detail, monochrome picture and a limited-detail, multicolor picture of the same scene are displayed in superposed relation.

3. Color television display apparatus comprising a screen composed of a plurality of white light-emitting elements, a plurality of red light-emitting elements, a plurality of green light-emitting elements, and a plurality of blue light-emitting elements, all mingled together in a regular, repetitive pattern, first exciting means for selectively exciting said white light-emitting elements only, second exciting means for selectively exciting said red light-emitting elements only, third exciting means for selectively exciting said green light-emitting elements only, fourth exciting means for selectively exciting said blue light-emitting elements only, electrical circuits for developing Y, $R-Y$, $G-Y$, and $B-Y$ video signals, where Y represents all of the luminance component, R represents all of the red component, G represents all of the green component, and B represents all of the blue component of a composite video signal, connections for supplying said Y signal to said first exciting means, whereby a full-detail, monochrome picture is displayed by said white light-emitting elements, a low-pass filter, connections for supplying said Y signal to said filter, whereby said filter transmits a luminance signal of reduced bandwidth, a plurality of adding circuits connected to add said luminance signal of reduced bandwidth to each of said $R-Y$, $B-Y$, and $G-Y$ signals, thereby providing R, G, and B video signals of restricted bandwidth, and connections for supplying said R, G, and B signals to said second, third, and fourth exciting means, respectively, whereby a limited-detail, full-color picture superposed on said monochrome picture is displayed by said red, green, and blue light-emitting elements.

References Cited in the file of this patent

UNITED STATES PATENTS 2,846,499 Heuer et al. _____________ Aug. 5, 1958